United States Patent [19]
Bonner et al.

[11] 3,886,533
[45] May 27, 1975

[54] MAGNETIC DEVICES UTILIZING GARNET EPITAXIAL MATERIAL

[75] Inventors: William Adam Bonner, Warren; Joseph Edward Geusic, Berkeley Heights; LeGrand Gerard Van Uitert, Morris Township, Morris County, all of N.J.

[73] Assignee: Bell Telephone Laboratories, Incorporated, Murray Hill, N.J.

[22] Filed: Jan. 23, 1974

[21] Appl. No.: 435,678

Related U.S. Application Data

[63] Continuation-in-part of Ser. No. 380,941, July 20, 1973, abandoned.

[52] U.S. Cl....... 340/174 TF; 252/62.57; 252/62.58; 252/62.59
[51] Int. Cl............................................. G11c 11/14
[58] Field of Search............ 340/174 TF; 252/62.56, 252/62.57, 62.58, 62.59

[56] References Cited

UNITED STATES PATENTS

| | | | |
|---|---|---|---|
| 3,639,247 | 2/1972 | Takamizawa et al. | 252/62.57 |
| 3,643,238 | 2/1972 | Bobeck et al. | 340/174 TF |

*Primary Examiner*—James W. Moffitt
*Attorney, Agent, or Firm*—G. S. Indig

[57] ABSTRACT

Members of a particular class of magnetic garnet compositions show characteristics useful for incorporation in magnetic memory devices which depend for their operation on the positioning of single wall domains ("bubbles"). Such compositions ordinarily in the form of a supported layer are noteworthy for high bubble mobility and small temperature dependence of magnetic properties affecting operation. These compositions include silicon and/or germanium as a partial replacement for iron.

12 Claims, 3 Drawing Figures

MAGNETIC DEVICES UTILIZING GARNET EPITAXIAL MATERIAL

CROSS REFERENCE TO RELATED APPLICATIONS

This application is a continuation-in-part of my co-pending application, Ser. No. 380,941, filed July 20, 1973 and now abandoned.

BACKGROUND OF THE INVENTION

1. Field of the Invention

The invention is concerned with magnetic "bubble" devices. In particular, the invention is concerned with devices which depend for their operation on a supported layer of magnetic garnet material, generally, but not necessarily, on a non-magnetic garnet substrate. Such devices depend for their operation on nucleation and/or propagation of small enclosed magnetic domains of polarization opposite to that of the immediately surrounding material. Functions which may be performed include switching, memory, logic, etc. 2. Description of the Prior Art For a number of years, there has been widespread interest in a class of memory or switching elements known as "bubble" devices. The term "bubble" is descriptive of the generally cylindrical form taken by the single wall domains, presence or absence of which constitutes the memory bits essential to operation. Such single wall domains, which may assume a variety of configurations, represent localized regions of one magnetic polarization within a surround of opposite polarization. Polarization, in either case, is largely orthogonal to a major surface of the device so that domains may be described as emergent—that is, with polarization "emerging" from a major plane. There is a vast body of literature on devices of this category. See, for example, Vol. MAG-5, No. 3 *IEEE Transactions on Magnetics* page 544 (Sept. 1969) and *Scientific American*, June (1971) p 78–90.

Material requirements imposed on magnetic compositions have, in many respects, been more stringent than those imposed by other devices. For example, contemplation of domain or bit size of the order of a micrometer or less has carried with it the attendant requirement that material imperfections affecting nucleation or propagation be of a smaller size scale. Requirements on uniformity, both physical and compositional, have been legend, and solutions to these many problems have been impressive. Technology has resulted in development: of supposedly centrosymmetric garnets evidencing controllable and pronounced, unique easy directions of magnetization; of procedures for growing epitaxial layers of perhaps the highest physical and compositional uniformity yet seen under growth conditions considered a marked departure from all prior techniques; and of ancillary advances, e.g., concerned with fine scale access circuitry, lithographic techniques, etc. The program has already had and will continue to have widespread implications in a variety of arts.

It has been recognized for some time that a major material problem involves the precise manner in which the emergent domain is produced. Since garnet materials have been the leading contenders for bubble devices for some time, concern over emergence has generally been in terms of such materials. Two major approaches have been followed: the first, "growth induced anisotropy" relies on mixed population in a given crystallographic site, usually the dodecahedral site. Such mixed population of appropriate ions results in some form of local strain or preferential ordering attendant upon growth. Growth-induced unique easy direction is maintained at all but extremely high temperature (temperatures not ordinarily contemplated during use.) Magnetic properties in growth-induced materials may, in selected compositions, be substantially temperature independent or may vary so as to match bubble properties to temperature in a desired manner. Characteristically, such compositions include praseodymium, neodymium, samarium, europium or terbium together with a different rare earth (or yttrium) ion. Growth induced materials are eminently useful for many device designs.

A second approach makes use of massive strain ordinarily induced by a disparity between crystallographic lattice dimensions of supported layer and substrate. For example, supported epitaxial materials evidencing a negative value of magnetostriction, when supported on a substrate material of larger lattice dimension, show the emergent domain behavior. Best "strain induced" materials have, to date, had the advantage of somewhat increased domain wall mobility as contrasted with the growth induced material but have shown the disadvantage of significant temperature dependence of magnetic properties of concern in device operation.

SUMMARY OF THE INVENTION

High mobility garnet materials with low temperature dependence of magnetization result from partial substitution of silicon and/or germanium for iron. Materials of the invention are epitaxial and emergent domains are at least in part due to massive strain attendant upon a small lattice mismatch between substrate and epitaxial layer. High mobility is a general characteristic of materials wherein the cations are largely s-state and having unique easy direction of magnetization induced principally by strain—as contrasted with most materials in which emergent domains are due to growth induced effects. There is no need for inclusion of most of those rare earth ions known to diminish domain wall mobility—as discussed under the Detailed Description, such ions necessarily included to produce the usual form of growth-induced unique easy direction of magnetization necessarily reduce mobility.

Improvement in temperature dependence results from the relatively high values of Curie temperature of the materials of the invention. Present operating characteristics of a bubble device utilizing a garnet material require reduction in magnetization to levels below about 500 Gauss. In general, dilution of magnetic moment has been accomplished by substitution of nonmagnetic ions, typically aluminum or gallium, for iron. It is well known that in the prototypical garnet composition net magnetization results from the difference in magnetization of oppositely aligned iron ions in tetrahedral and octahedral sites. Net magnetization results from the fact that there are three tetrahedrally coordinated irons for every two octahedrally coordinated irons. Substitution of aluminum or gallium is largely preferential with most of the nonmagnetic ions going into tetrahedral sites, and this, in consequence, reduces moment. Some such ions, however, replace octahedral iron ions—this occurs to a larger extent for aluminum than gallium—causing a disproportionate lowering in Curie temperature. (The effect on Curie point of an octahedral substitution tends to be several times greater than that of a tetrahedral substitution.) Lowering the Curie temperature generally increases temperature dependence of magnetization at any operating temperature.

Improvement in temperature dependence of materials of the invention is due to use of germanium and/or silicon to dilute the iron. Preference of such diluent for the tetrahedral site is significantly more pronounced than for gallium or aluminum so that requisite magnetization lowering is accomplished with minimal effect on Curie temperature.

Other compositional requirements come about from a variety of considerations. Accordingly, a valence compensating ion, such as Sr, Ca or Cd, but usually calcium, permits substitution of the tetravalent silicon or germanium for trivalent iron; and small but critical amounts of certain rare earths, as well as certain other substituents, may be incorporated to accomplish other objectives—e.g., ease of growth, appropriate lattice parameter adjustment to yield the desired strain induced anisotropy, etc.

A variety of substrate materials may be utilized, the main requirement being that they be of such lattice dimension as to introduce the appropriate strain and that they otherwise have appropriate characteristics for such use. In general, substrates are nonmagnetic although some designs require nonzero magnetization and other magnetic properties differing from those of the epitaxial layer. A nonmagnetic substrate that has been found suitable for materials of the invention is $Gd_3Ga_5O_{12}$.

DETAILED DESCRIPTION

1. The Figures

Figure 1:
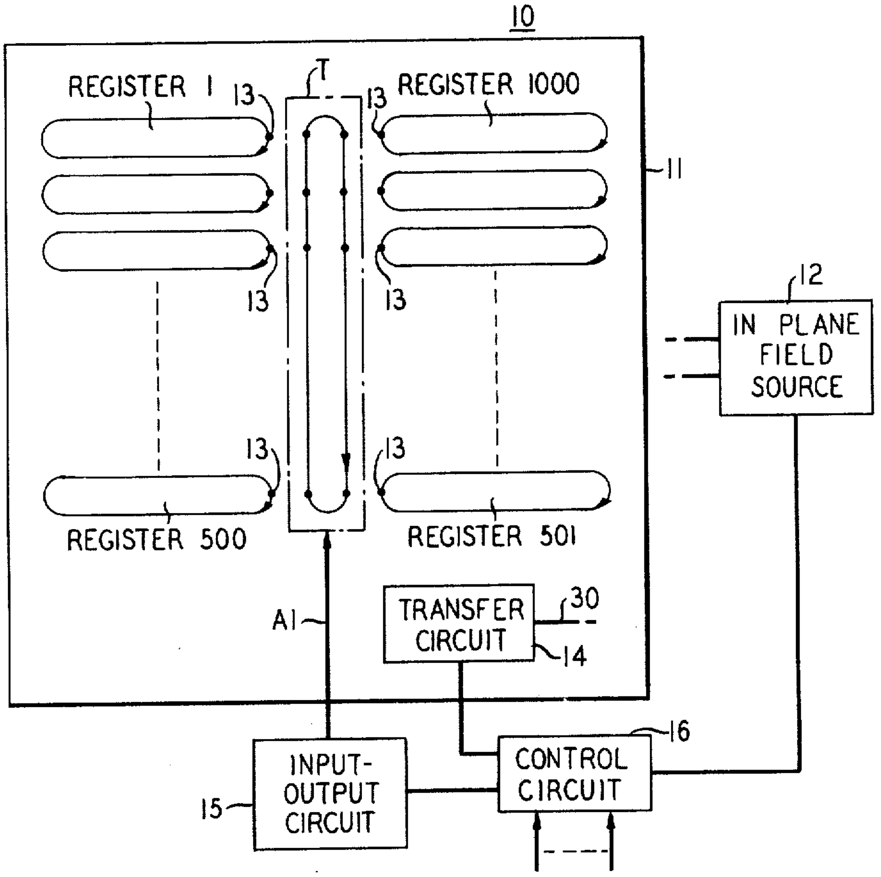
FIG. 1 is a schematic diagram of a recirculating memory in accordance with the invention.
Figure 2:
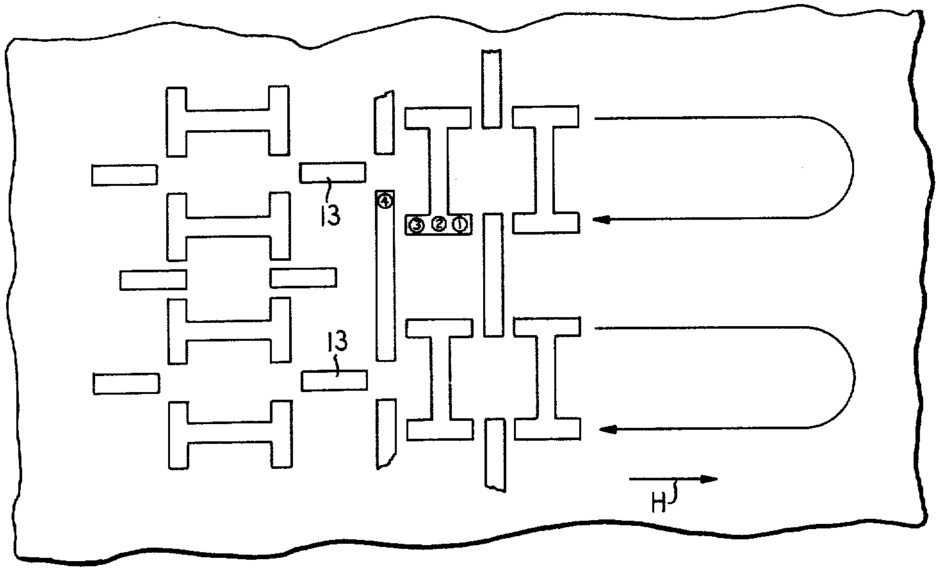
FIG. 2 is a detailed magnetic overlay and wiring configuration for portions of the memory of FIG. 1 showing domain locations during operation.

The device of FIGS. 1 and 2 is illustrative of the class of "bubble" devices described in *IEEE Transactions on Magnetics*, Vol. MAG-5, No. 3, Sept. 1969, pp. 544–553, in which switching, memory and logic functions depend upon the nucleation and propagation of enclosed, generally cylindrically shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a somewhat advanced stage of development of the bubble devices and includes some details which have been utilized in recently operated devices.

FIG. 1 shows an arrangement 10 including one or more layers 11 of material in at least one of which single wall domains can be moved. The movement of domains, in accordance with this invention, is dictated by patterns of magnetically soft overlay material in response to reorienting in-plane fields. For purposes of description, the overlays are bar and T-shaped segments and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature, as is well understood. The overlay configuration is not shown in detail in FIG. 1. Rather, only closed "information" loops are shown in order to permit a simplified explanation of the basic organization in accordance with this invention unencumbered by the details of the implementation. We will return to an explanation of the implementation hereinafter.

The figure shows a number of horizontal closed loops separated into right and left banks by a vertical closed loop as viewed. It is helpful to visualize information, i.e., domain patterns, circulating clockwise in each loop as an in-plane field rotates clockwise.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unocuppied. A binary word comprises a domain pattern which occupies simultaneously all the positions 13 in one or both banks, depending on the specific organization, at a given instance. It may be appreciated that a binary word so represented is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions 13 where a transfer operation moves the pattern from the vertical channel back into appropriate horizontal channels as described above. Once again, the information movement is always synchronized by the rotating field so that when transfer is carried out appropriate vacancies are available in the horizontal channels at positions 13 of FIG. 1 to accept information. For simplicity, the movement of only a single domain, representing a binary one, from a horizontal channel into the vertical channel is illustrated. The operation for all the channels is the same as is the movement of the absence of a domain representing a binary zero. FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portions of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3, and 4 in FIG. 2, these positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields (considered unnecessary to this description). The consecutive positions from the right as viewed in FIG. 2 for a domain adjacent the vertical channel preparatory to a transfer operation are described. A domain in position 4 of FIG. 2 is ready to begin its transfer cycle.

Figure 3:
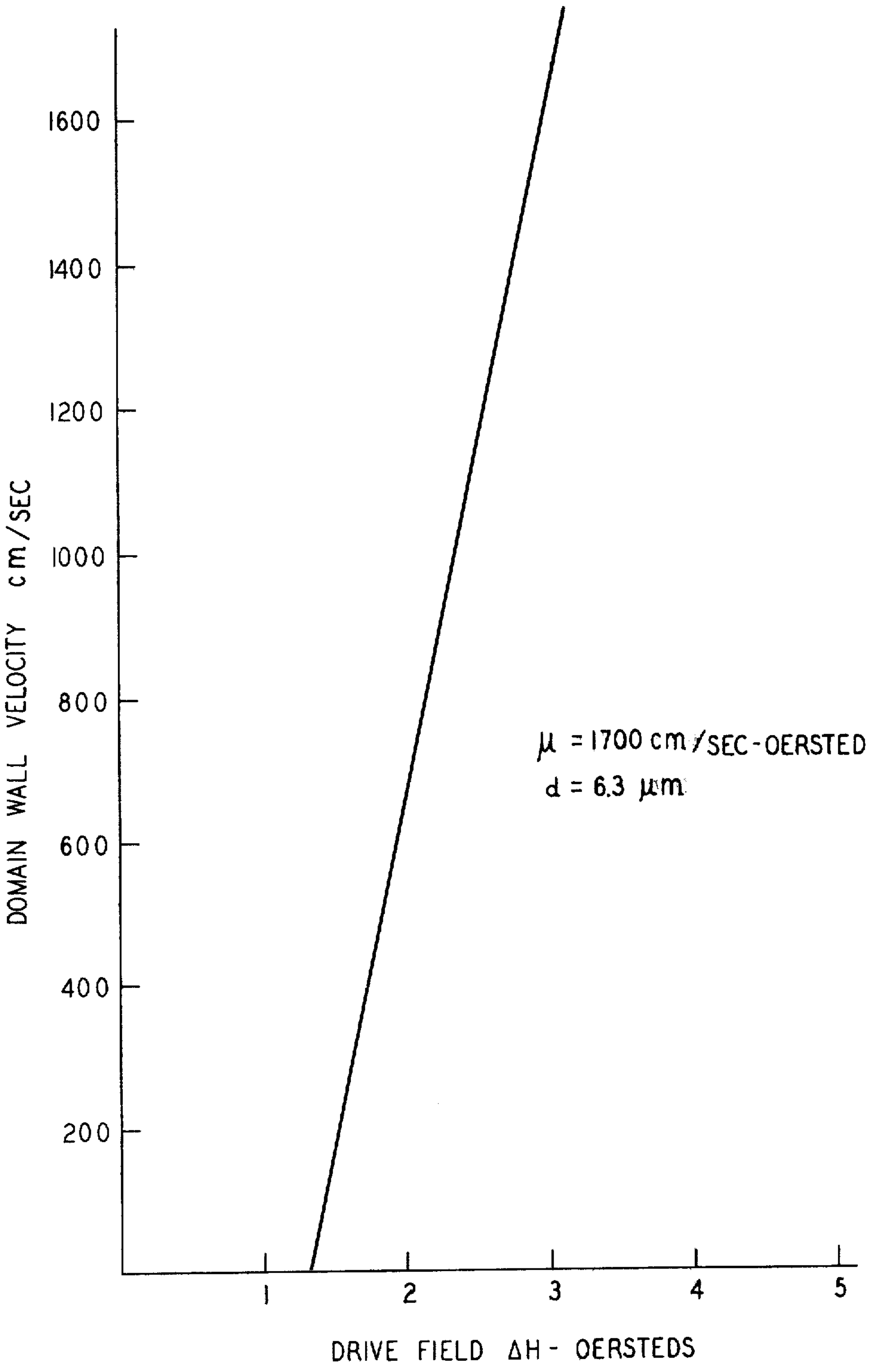
FIG. 3 is a plot which relates domain wall velocity to drive field for an epitaxial layer of the composition $Y_{1.9}Lu_{0.2}Ca_{0.9}Ge_{0.9}Fe_{4.1}O_{12}$ on a substrate of $Gd_3Ga_5O_{12}$. The slope of this curve, characteristic of compositions of the invention, indicates a mobility of about 1700 cm/sec/-oe. The Curie point for the composition plotted in FIG. 3 is approximately 185°C. Dilution of this composition is sufficient to result in lowering of magnetization, $4\pi M$, to a value of approximately 200 Gauss. By comparison, dilution to produce a garnet composition of this moment requires approximately 1.15 atom gallium or 1.3 atom aluminum for the formula units noted and results in Curie points of 100°C and 70°C, respectively.

FIG. 3 relates domain wall velocity to drive field for a film of $Y_{1.9}Lu_{0.2}Ca_{0.9}Ge_{0.9}Fe_{4.1}O_{12}$ on $Gd_3Ga_5O_{12}$. The slope of the curve shows that mobility is ~1700cm/sec. × Oe. in this material. This value compares favorably to those obtained with Ga or Al substitutions. However, the temperature dependence characteristics of the latter are greater. This fact may be attributed to the relatively high percent of $Ga^{3+}$ or $Al^{3+}$ that enters octahedral sites as a result of relatively high growth temperatures, e.g., liquid phase epitaxy requires about 1000°C.

2. Composition

Garnets suitable for the practice of the invention are of the general stoichiometry of the prototypical compound $Y_3Fe_5O_{12}$. This is the classical yttrium iron garnet (YIG) which, in its unaltered form, is ferrimagnetic with net moment being due to the predominance of one iron ion per formula unit in the tetrahedral site. In this prototypical compound, yttrium occupies a dodecahedral site. The primary composition requirement, in accordance with the invention, is concerned with the nature of the ions in part replacing iron in the tetrahedral sites to reduce magnetization.

The usual compositional range in accordance with the invention may be expressed as: $(Y,LA,Lu,Bi)_{3-a-b}R_aM_bFe_{5-c-d-e}(Al,Ga)_c(Si,Ge)_dV_eO_{12}$ where R is at least one or a combination of Pr, Nd, Sm, Gd, Tb, Dy, Ho, Er, Tm, Yb; M is at least one of Ca, Sr and Cd; $a$ is from 0–0.2 for all except Tb, Dy and Ho for which $a$ is from 0–0.1, $b$ is from 0.5–1.5; $c$ is from 0–0.5; $d$ is from 0.5–1.3; and $e$ is from 0–0.5. A further requirement is that $d$ be at least equal to $c + e$ (i.e., at least one-half of the ions replacing iron be silicon and/or germanium). The permissible amounts of Tb, Dy and Ho are reduced to half of that of the other R-ions since these three markedly reduce domain wall mobility and Tb has an excessively large (+) magnetostriction.

The requirement that at least 50 percent of those ions replacing iron be silicon and/or germanium assures sufficiently high Curie points to result in the lowered temperature dependence of the inventive materials. In general, the preference exists for larger silicon and/or germanium substitution, in fact, for substantially total substitution to the extent of the desired dilution. As discussed, a preference for Ge over Si suggests that at least 50 percent of $d$ be Ge. (The formula provides for reduction of moment to that corresponding with approximately ½ atom of predominant tetrahedral iron up to an amount sufficient to result in predominance of approximately 0.7 of octahedrally coordinated iron.) Provision for relatively small amounts of aluminum and/or gallium results in an undesirable lowering of Curie point but may be useful for other purposes —e.g., for adjusting lattice size to accommodate a particular substrate.

Adjustment of magnetization is best accomplished by silicon and/or germanium, as described. However, this substitution requires compensation, generally by use of the divalent ion of calcium. Use of amounts of calcium or strontium in excess of the maximum noted (1.5/formula unit) may result in some growth difficulty due to the relatively large size of this substituent ion as compared with other ions occupying the dodecahedral site.

Similarly, while mobility is best assured by use of lanthanum, lutetium, yttrium or bismuth in the dodecahedral site, provision is made for minor inclusions of any of the enumerated R-ions. Again, inclusion of such ions is not desirable from the operational standpoint, since they have the effect of somewhat lowering mobility. Inclusion is dictated by other considerations, again, such as, adjustment of lattice parameter or tailoring bubble domain stability to meet certain device considerations.

Occupancy of essentially all but a maximum of 0.2 dodecahedral sites by lanthanum, yttrium, lutetium, bismuth calcium, strontium and/or cadmium limits possible growth-induced effects, since these generally result from ordering that involves at least one paramagnetic rare earth ion in these sites. Minor inclusions of the R-ions permitted in the formula may, as noted, be made to adjust lattice parameters. Additional purposes served may include the introduction of a limited growth-induced anisotropy to meet certain device specifications and particularly in the instance of Tm, Yb, or Er, the avoidance of velocity saturation.

The following Table indicates the Curie temperatures obtainable in a variety of compositions. Compositions are all designed to produce the same saturation magnetization, i.e., 200 Gauss. Compositions included are of three classes: (1) that represented by the invention; (2) that depending upon vanadium substitution; and (3) that in which magnetization is reduced by gallium or aluminum substitution.

Table I

| Composition for $4\pi M_s$ = 200 Gauss | $T_c$ deg. C | Fe-field Alignment |
|---|---|---|
| $Y_{1.2}Ca_{1.5}V_{0.9}Fe_{4.1}O_{12}$ | ~270 | tetrahedral |
| $Y_{2.07}Ca_{0.93}Si_{0.93}Fe_{4.07}O_{12}$ | ~200 | " |
| $Y_{2.07}Ca_{0.93}Ge_{0.93}Fe_{4.07}O_{12}$ | ~180 | " |
| $Y_{1.9}Ca_{1.1}Ge_{1.1}Fe_{3.9}O_{12}$ | ~160 | octahedral |
| $Y_3Ga_{1.15}Fe_{3.85}O_{12}$ | ~100 | tetrahedral |
| $Y_3Al_{1.3}Fe_{3.7}O_{12}$ | ~70 | " |

Table I provides a comparison of $T_c$ for various compositions adjusted to have $4\pi M_s = 200$ Gauss, a nominally useful moment for bubble domain devices. It can be seen that $T_c$ is low when $Ga^{3+}$ or $Al^{3+}$ substitutions for $Fe^{3+}$ are used to lower $4\pi M_s$ and high when $V^{5+}$ is employed. $Ge^{4+}$ and $Si^{4+}$ also afford high values of $T_c$ but do so without requiring excessively large contents of $Ca^{2+}$ to be present (a requirement resulting in growth difficulty). In general, for small cations, the highly charged cations have the greater tendency to enter tetrahedral sites.

| $V^{5+}$> | $Si^{4+}$, | $Ge^{4+}$> | $Al^{3+}$, | $Ga^{3+}$ |
|---|---|---|---|---|
| 100 | 99 | 85 | 90 | |

The lower numbers indicate the percent of the indicated ions generally found in tetrahedral sites under typical growth conditions, i.e., at a temperature of about 1000°C. To keep $T_c$ high, one prefers the highly charged cations. However, in the case of $V^{5+}$ the accompanying requirement of twice the amount of $Ca^{2+}$ limits its usefulness to relatively low concentrations due to growth difficulties; nominally one-half that of the allowable $Si^{4+}$ or $Ge^{4+}$.

High mobility values in materials of the invention are those associated with prototype materials which do not include large amounts of paramagnetic R ions in the dodecahedral site. Such ions represented by most of the lanthanide rare earth series ($Gd^{3+}$ excepted) evidence an orbital angular momentum which results in interaction of the moment with the crystal field, leading to reduced mobility. Gadolinium which is paramagnetic has a spherical electron distribution in the ground state for which there is no orbital angular momentum and so has far less effect on mobility than other paramagnetic lanthanide ions. Choice of materials of the invention in preference to those in which unique anisotropy is introduced primarily by growth induced effects which must take bubble domain stability into account. This parameter is frequently expressed in terms of the symbol Q in accordance with the equation:

$$Q = \frac{K_u}{2\pi M^2} \qquad (1)$$

where $K_u$ is the uniaxial anisotropy constant representing both growth and strain induced components, and M is magnetic moment. Q, in general, is a measure of stability of operation. For example, it is a measure of the degree to which a bubble may distort from its cylindrical shape under a given set of operating conditions. For many device designs, it is desirable that Q be greater than or equal to four; and values of Q in this range are attainable in compositions of the invention. To keep domain wall mobility ($\mu$) large ($\mu > 1000$) the concentration of paramagnetic ions that contribute to growth induced anisotropy should be minimized so that at least 50 percent and preferably at least 60 percent of the induced $K_u$ is due to strain rather than cation ordering. To achieve this the film should have a negative magnetostriction and a lattice constant that is at least 0.005 Angstrom units smaller than that of the substrate, e.g., for $Y_{1.88}Lu_{0.2}Ca^{0.92}Ge_{0.92}Fe_{4.08}O_{12}$ on $Gd_3Ga_5O_{12}$; $\mu > 2000$, $Q = 4.5$.

In these materials there are at least two types of dodecahedral cations, one being divalent (e.g., $Ca^{2+}$) and another trivalent (e.g., $Y^{3+}$). Paramagnetic rare earth ions, that may be added in small amounts include Pr, Nd, Sm, Eu, Gd, Er, Tm and Yb. To improve Q, additions of Eu are generally preferred, although Pr, Nd, Sm or Tb may also be used. Where so required, a range of Eu from (a) = 0.03 to 0.15 is preferred. Additions of Er, Tm and Yb are usually preferred to diminish velocity limiting effects. However Dy, Ho and Tb can also serve for this purpose in lesser amounts. Gd can be used to lower moment where convenient. R-ion additions that occupy less than 7 percent of the dodecahedral sites (0.2 out of 3), and preferably less than three-fourth of this value, where maximum domain wall mobility is desired, are useful.

These additions do not alter magnetostriction in excess of the permissible amounts. A mismatch of the film lattice constant to that of the substrate where $a_o$ for the film is ~0.010 Angstrom units less than that for the substrate is preferred and results in a desirable strain induced anisotropy. Larger values are often tolerable and sometimes desirable to meet device needs. However, mismatches exceeding ~0.017 Angstrom units tend to lead to cracking of the film. La and Bi may be included among nonmagnetic ions in didecahedral sites to broaden the selection of substitutions. Here an important effect is to facilitate lattice parameter adjustment to substrates with lattice constants larger than that of $Gd_3Ga_5O_{12}$.

Where substrates with lattice constants smaller than that of $Gd_3Ga_5O_{12}$ are used, such as $Y_3Ga_5O_{12}$ ($a_o$ = 12,280); relatively large amount of Lu may be used to reduce the lattice constant of the film and avoid cracking.

Ionic constituents in tetrahedral sites can also be critical. As can be seen from Table I, vanadium substitutions are most effective in lowering $4\pi M_s$. However, for each $V^{5+}$ in a tetrahedral site, two $Ca^{2+}$ ions must be located in didecahedral sites. The high level of Ca that must be introduced into the magnetic film is prohibitive of growth of good quality, uniform layers. It has been determined experimentally that it is possible to grow satisfactory films of bubble domain materials containing Sr + Si, Cd + Ge, Cd + Si, Ca + Ge or Ca + Si in the requisite amounts. However, even here some grow more readily than others. The Ca + Ge combination is favored for this reason and because the combination has an average size close to that of Y + Fe. The latter permit a large range of property adjustments to be made without affecting the fit to the substrate employed. This is of particular interest as the lattice parameter of $Y_3Fe_5O_{12}$ is a close match to $Gd_3Ga_5O_{12}$. In certain cases where large ions such as $Eu^{3+}$ or $Pr^{3+}$ are incorporated to modify properties, it may be convenient to utilize some $Ga^{3+}$ or $Al^{3+}$ in reducing $4\pi M_s$ as these ions as well as $Si^{4+}$ and $Ge^{4+}$ are smaller than the $Fe^{3+}$ they replace. Further silicon additions as $Si^{4+}$ can be used in part to replace $Ge^{4+}$ with the same effect. In any case substitutions for $Fe^{3+}$ should be at least 50 percent Ge and/or Si and in preferred cases largely Ge.

Film Growth

A typical melt is composed of 8 wt percent crystal components and 92 wt percent flux. The flux $PbO:B_2O_3$ is mixed in a 50 to 1 wt ratio. The rare earth and yttria components are mixed stoichiometrically with the anticipated distribution between film and melt taken to be unity. $Fe_2O_3$ is mixed in the desired molar ratio with any $Ga_2O_3$ or $Al_2O_3$, and the whole combined in a 10–15 to 1 molar ratio with the rare earths. Calcium and silicon or calcium and germanium oxides are incorporated in the melt individually as the same added weight percentages of the above-combined crystal components. Fortuitously, the mole percent of Ge or Si replacing Fe in the film corresponds to the weight percent of the specified crystal components added. Of course, an equivalent amount of Ca is also present in the dodecahedral sites.

The melt compositions used in preparing the films discussed in Examples 1–4 are given in Table II. Calculated lattice constants ($a_0$) and estimated mismatch ($\Delta a_0$) to $Gd_3Ga_5O_{12}$ ($a_0 \approx 12.3832$) is also given.

TABLE II

| Compositions | |
|---|---|
| *a*- $Y_{1.9}Lu_{0.2}Ca_{0.9}Ge_{0.9}Fe_{4.1}O_{12}$ | $a_0$=12.3664 $\Delta a_0$=0.0168 |
| *b*- $Y_{1.8}Lu_{0.2}Eu_{0.1}Ca_{0.9}Ge_{0.9}Fe_{4.1}O_{12}$ | $a_0$=12.3706 $\Delta a_0$=0.0126 |
| *c*- $Y_{2.1}Ca_{0.9}Ge_{0.8}Si_{0.1}Fe_{4.1}O_{12}$ | $a_0$=12.3723 $\Delta a_0$=0.0109 |
| *d*- $Y_{1.82}Lu_{0.25}Eu_{0.15}Ca_{0.78}Ge_{0.78}Fe_{4.22}O_{12}$ | $a_0$=12.3708 $\Delta a_0$=0.0124 |
| *e*- $Y_{1.89}Lu_{0.01}Ca_{1.1}Ge_{1.1}Fe_{3.9}O_{12}$ | $a_0$=12.3704 $\Delta a_0$=0.0128 |

| | Weights in Grams | | | | |
|---|---|---|---|---|---|
| Oxide | *a* | *b* | *c* | *d* | *e* |
| $Y_2O_3$ | 3.1613 | 3.0484 | 3.3871 | 2.9355 | 3.3758 |
| $Lu_2O_3$ | 0.3974 | 0.3978 | — | 0.4974 | 0.0198 |
| $Eu_2O_3$ | — | 0.1785 | — | 0.2639 | — |
| CaO | 3.94 | 4.536 | 4.26 | 4.08 | 5.23 |
| $GeO_2$ | 3.94 | 4.536 | 4.03 | 4.08 | 5.23 |
| $SiO_2$ | — | — | 0.24 | — | — |
| $Fe_2O_3$ | 21.36 | 21.73 | 20.32 | 22.18 | 20.3736 |
| PbO | 281.0 | 292.0 | 267.0 | 291.8 | 768.2 |
| $B_2O_3$ | 5.7 | 5.8 | 5.5 | 6.0 | 5.5 |

The indicated mismatches ($\Delta a_0$) actually realized are generally somewhat smaller than indicated due to expansion of the film lattice by incorporation of variable amounts of Pb from the flux.

The epitaxial films reported here were grown by the liquid phase dipping technique onto (111) substrate plates of $Gd_3Ga_5O_{12}$. A 12 inch high vertical furnace containing a 3 inch I.D. Pt-20 percent Rh wire-wound muffle was employed. Suitable baffling and closures provide the low thermal gradient necessary for the production of uniform thickness films. A typical melt consists of about 400 Gauss of crystal components and flux and fills a standard form 100 cc platinum crucible to about two-thirds of capacity. The components were melted at about 1020°–1050° C and held 24 hours at temperature to assure complete solution. Prior to film growth the temperature was lowered to ~960° C (supersaturated ~20° C) and allowed to thermally equilibrate for ~4 hours. The substrate was mounted horizontally using a three-prong holder, lowered to just above the melt surface, and held in that position for about 5 minutes to approach the temperature of the bath. It was then immersed to a depth of about ¾ inch and rotated at 300 rpm for 4–8 minutes to obtain a film 6–8 $\mu$M thick. It is then raised above the melt and spun ~30 sec at 300–500 rpm to throw off any remaining flux. The clean film is then raised out of the furnace over about a 5 minute period to minimize thermal shock. At growth rates of about 1 $\mu$M/min uniformly thick and defect-free films approaching 1 $cm^2$are easily obtained.

Example 1

Bias field of 100 oersteds was applied to an 11 micrometer thick layer of $Y_{1.9}\,Lu_{0.2}\,Ca_{0.9}\,Ge_{0.9}\,Fe_{4.1}\,O_{12}$ on $Gd_3Ga_5O_{12}$. Single wall domains had a diameter of about 6 micrometers and were stable from 3 to 9 micrometers, with such stable size obtained over a temperature range of from abut 200° K to 453° K. the mobility was found to be about 1700cm/second × oersted and a velocity for a field of 3 oersteds was about 1600cm/sec.

EXAMPLE 2

Bias field of 90 oersteds was applied to a 7 micrometer thick layer of $Y_{1.8}\,Lu_{0.2}\,Eu_{0.1}\,Ca_{0.9}\,Ge_{0.9}\,Fe_{4.1}\,O_{12}$ on $Gd_3Ga_5O_{12}$. Single wall domains had a diameter of about 7 micrometers and were stable from 3.5 to 10.5 micrometers, with such stable size obtained over a temperature range from about 200° K to 450° K. The mobility was found to be about 1500cm/sec. × Oe. Velocity for a field of 3 oersteds was about 1400cm/sec.

EXAMPLE 3

Bias field of 100 oersteds was applied to an 8 micrometer thick layer of $Y_{2.1}\,Ca_{0.9}\,Ge_{0.8}\,Si_{0.1}\,Fe_{4.1}\,O_{12}$ $Gd_3Ga_5O_{12}$. Single wall domains had a diameter of about 4 micrometers and were stable from 2 to 6 micrometers, with such stable size obtained over a temperature range of from 200° K to 460° K. The mobility was found to be about 1800cm/sec. × Oe with velocity for a field of 3 oersteds 1800cm/sec.

EXAMPLE 4

This example relates to a two-layer self-structuring film on a substrate of $Gd_3Ga_5O_{12}$.

The first layer deposited was (d) of Table II, i.e., $Y_{1.82}Lu_{0.25}Eu_{0.15}Ca_{0.78}Ge_{0.78}Fe_{4.22}O_{12}$. It has a lattice constant ~0.012 Angstrom units smaller than that of $Gd_3Ga_5O_{12}$. The film thickness was 10.7$\mu$M. a stable bubble diameter of ~3.4$\mu$M was observed and $4\pi M_s$ was found to be ~400 Gauss.

The second (or upper) layer was (e) of Table II, i.e., $Y_{1.89}Lu_{0.01}Ca_{1.1}Ge_{1.1}Fe_{3.9}O_{12}$. Its lattice constant is slightly smaller than that of the first film. The film thickness was 3.5$\mu$M and a stable bubble diameter of ~3.4$\mu$M was observed. $4\pi M_s$ for this film was ~200 Gauss.

For the upper film, the moment is aligned with the vector for the Fe-ions in octahedral sites; while for the lower film, the opposite holds due to a greater concentration of Fe-ions in tetrahedral sites. The net result is the formation of a wall between the two films.

In a bias field of about 100 oersteds, undulating strips exist in the lower film and bubble domains are present in the upper. This meets the requirements set forth in Pat. application Ser. No. 327,625 filed on Jan. 29, 1973, for self-structural circuits.

Hard bubbles can be suppressed by providing means for domain closures. This can be achieved by ion implantation of the upper surface of the grown film, as long as it has a negative magnetostriction, or by deposition of an additional magnetic film that has a larger moment (e.g., at least four times larger than that of the bubble domain region) onto the substrate prior to deposition of the bubble domain film or subsequent to the deposition of the latter or both. The layer(s) with the larger moments have their magnetic vectors lying in the plane. An example of the high moment film is $Y_3Fe_5O_{12}$, again on a $Gd_3Ga_5O_{12}$ substrate. This is a suitable match inasmuch as the film and substrate have approximately the same lattice constant. The bubble domain layer may be $(YCa)_3(GeFe)_5O_{12}$ in this case.

What is claimed is:

1. Memory device comprising a substrate supporting at least a first epitaxial layer, the said layer being capable of evidencing uniaxial magnetic anisotropy capable of supporting local enclosed regions of magnetic polarization opposite to that of surrounding material and provided with first means for magnetically biasing said layer to stabilize said regions, second means for positioning such oppositely polarized local and enclosed regions, and third means for propagating such local regions, said material being of the garnet structure, characterized in that the composition of the said material of the said first layer may be represented by the atom formula $(Y,La,Lu,Bi)_{3-a-b}R_aM_bFe_{5-c-d-e}(Al,Ga)_c\ (Si,Ge)_dV_eO_{12}$, where R is one or a combination of Pr, Nd, Sm, Eu, Gd, Tb, Dy, Ho, Er, Tm and Yb and where R is at least 50 percent Eu; M is at least one of Ca, Sr and Cd; $a$ is from 0.03–0.2 for all except Tb, Dy and Ho for which $a$ is from 0.03–0.1; $b$ is from 0.5–1.5; $c$ is from 0–0.5; $d$ is from 0.5–1.3; and $e$ is from 0–0.5 and herein $d$ is at least equal to $c + e$ (i.e., at least one-half of the ions replacing iron are silicon and/or germanium); the said first layer having a magnetostrictive value which is of negative sign, the said first layer and substrate being mismatched in lattice parameter by an amount expressed as a differential value of the lattice parameter $a_o$ of from 0.005 to 0.017 with the valve of the said lattice parameter being larger for the substrate so as to result in strain induced anisotropy resulting in polarization direction normal to the plane of the said first layer, the total said anisotropy being at least 50 percent due to strain resulting from the said mismatch in the lattice parameter.

2. Devices of claim 1 in which M consists essentially of Ca.

3. Device of claim 1 in which the said anisotropy is at least 60 percent due to the strain resulting from the said mismatch in lattice parameter.

4. Device of claim 3 in which the differential value of $a_o$ is at least 0.010.

5. A device of claim 1 in which (Si,Ge) is at least 50 atoms percent Ge.

6. Device of claim 5 in which (Si,Ge) is substantially Ge.

7. Device of claim 1 including a second epitaxial layer, said second layer having a magnetization $4\pi M_s$ at least four times greater than that of the said first layer and in which there is intimate contact between said first and second layers.

8. Device of claim 7 in which the said second layer is intermediate the substrate in the said first and second layers.

9. Device of claim 7 in which the said first layer is intermediate the substrate and the said second layer.

10. Device of claim 7 including a third epitaxial layer also of magnetization $4\pi M_s$ at least four times greater than that of the said first layer and in which the order of the said layers is such that the said first layer is intermediate the said second and third layers.

11. Device of claim 1 in which the numerical value of $c$ and $d$ is less than about one so that the net moment of the said first layer is dominated by iron ions occupying tetrahedral sites.

12. Device of claim 11 in which there is a second layer in which $c$ and $d$ numerically total greater than about one so that net moment in the said second layer is dominated by iron ions in octahedral sites, the said first and second layers being in intimate contact.

* * * * *